United States Patent [19]

Cuadrado

[11] Patent Number: 5,541,664
[45] Date of Patent: Jul. 30, 1996

[54] TELEVISION VIEWING DISTANCE SAFETY SYSTEM

[76] Inventor: Juan Cuadrado, 432 New York Ave., Apt. A, Jersey City, N.J. 07307

[21] Appl. No.: 514,688

[22] Filed: Aug. 14, 1995

[51] Int. Cl.$^6$ ................................................. H04N 5/44
[52] U.S. Cl. .................................. 348/553; 348/725
[58] Field of Search ................................. 348/552, 553, 348/725, 61, 180; H04N 5/44

[56] References Cited

U.S. PATENT DOCUMENTS

| 4,417,278 | 11/1983 | Hensleigh et al. | 348/553 |
| 4,831,448 | 5/1989 | Park | 348/553 |

Primary Examiner—Victor R. Kostak

[57] ABSTRACT

A television viewing distance safety system including a television receiver having a viewable screen; a sensor assembly mechanism positioned at a location proximal to the screen of a television receiver for radiating a signal to a remote location in front of the screen, detecting a reflected portion of the signal from an object positioned within a predetermined distance therefrom, and transmitting an indication of the presence of the detected object; an alarm mechanism coupled to the sensor assembly means for providing a warning upon receipt of the indication to signify the presence of the detected object; a timed switching mechanism coupled between the alarm mechanism and the television receiver and with the timed switching mechanism being responsive to the activation of the alarm means for preventing delivery of electrical power to the television receiver; and a power supply mechanism coupled to the sensor assembly mechanism, the alarm mechanism, and timed switching mechanism for supplying electrical power for operation.

2 Claims, 5 Drawing Sheets

TELEVISION VIEWING DISTANCE SAFETY SYSTEM

BACKGROUND OF THE INVENTION

1. Field of the Invention

The present invention relates to a television viewing distance safety system and more particularly pertains to preventing children from watching television at a potentially harmful close viewing distance with a television viewing distance safety system.

2. Description of the Prior Art

The use of television safety mechanisms is known in the prior art. More specifically, television safety mechanisms heretofore devised and utilized for the purpose of preventing viewers from watching television too closely are known to consist basically of familiar, expected and obvious structural configurations, notwithstanding the myriad of designs encompassed by the crowded prior art which have been developed for the fulfillment of countless objectives and requirements.

While these prior devices fulfill their respective, particular objective and requirements, they do not provide for television viewing distance safety system that automatically turns off a television receiver when a child is positioned too close to its screen and turns on the television receiver when the child moves to a location greater than a predetermined distance from such screen.

In this respect, the television viewing distance safety system according to the present invention substantially departs from the conventional concepts and designs of the prior art, and in doing so provides an apparatus primarily developed for the purpose of preventing children from watching television at a potentially harmful close viewing distance.

Therefore, it can be appreciated that there exists a continuing need for new and improved television viewing distance safety system which can be used for preventing children from watching television at a potentially harmful close viewing distance. In this regard, the present invention substantially fulfills this need.

SUMMARY OF THE INVENTION

In the view of the foregoing disadvantages inherent in the known types of television safety mechanisms now present in the prior art, the present invention provides an improved television viewing distance safety system. As such, the general purpose of the present invention, which will be described subsequently in greater detail, is to provide a new and improved television viewing distance safety system and method which has all the advantages of the prior art and none of the disadvantages.

To attain this, the present invention essentially comprises, in combination, a rigid box-shaped hollow housing having a bottom wall, a top wall, and a periphery interconnected therebetween formed of a front wall, a rear wall, and a pair of opposed long side walls. The bottom wall also has a plurality of feet extended downwards therefrom for positioning the housing upon a recipient surface proximal to a screen of a television receiver. The front wall further has a generally transparent rectangular window formed thereon.

A sensor assembly means is disposed within the housing for radiating a signal through the window to a remote location in front of the screen of the television receiver, detecting a reflected portion of the signal through the window from an object positioned within a predetermined distance therefrom, and transmitting an indication of the presence of the detected object. The sensor assembly means has a manually actuated dialable switch means cooperative therewith and extended through the top wall of the housing for allowing the predetermined distance to be changed. An alarm means is included. The alarm means is coupled to the sensor assembly means and extended through the front wall of the housing for providing a visual warning upon receipt of the indication to signify the presence of the detected object. An auxiliary electrical receptacle is provided and coupled to the back wall of the housing. The receptacle is securable to a plug end of the television receiver for supplying electrical power thereto for operation. A timed switching means is included and coupled between the alarm means and the electrical receptacle. The timed switching means is responsive to the activation of the alarm means for preventing delivery of electrical power to the electrical receptacle after a predetermined amount of time. A power cable is included for supplying electrical power. The power cable has a distal plug end securable to a remote electrical power source and a proximal terminal end extended within the housing. Lastly, a power switch is coupled between the terminal end of the power cable and the sensor assembly means, the alarm means, and the timed switching means. The power switch has one orientation for allowing supply of electrical power for operation of the television viewing distance safety system and the television receiver securable thereto and another orientation for preventing such supply.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved television viewing distance safety system which has all the advantages of the prior art television safety mechanisms and none of the disadvantages.

It is another object of the present invention to provide a new and improved television viewing distance safety system which may be easily and efficiently manufactured and marketed.

It is a further object of the present invention to provide a new and improved television viewing distance safety system which is of durable and reliable construction.

An even further object of the present invention is to provide a new and improved television viewing distance safety system which is susceptible of a low cost of manufacture with regard to both materials and labor, and which accordingly is then susceptible of low prices of sale to the consuming public, thereby making such a television viewing distance safety system economically available to the buying public.

Still yet another object of the present invention is to provide a new and improved television viewing distance safety system which provides in the apparatuses and methods of the prior art some of the advantages thereof, while simultaneously overcoming some of the disadvantages normally associated therewith.

Even still another object of the present invention is to provide a new and improved television viewing distance safety system for preventing children from watching television at a potentially harmful close viewing distance.

Lastly, it is an object of the present invention to provide a new and improved television viewing distance safety system comprising a television receiver having a viewable screen; a sensor assembly mechanism positioned at a location proximal to the screen of a television receiver for radiating a signal to a remote location in front of the screen, detecting a reflected portion of the signal from an object positioned within a predetermined distance therefrom, and transmitting an indication of the presence of the detected object; an alarm mechanism coupled to the sensor assembly means for providing a warning upon receipt of the indication to signify the presence of the detected object; a timed switching mechanism coupled between the alarm mechanism and the television receiver and with the timed switching mechanism being responsive to the activation of the alarm means for preventing delivery of electrical power to the television receiver; and a power supply mechanism coupled to the sensor assembly mechanism, the alarm mechanism, and timed switching mechanism for supplying electrical power for operation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

With reference now to the drawings, the preferred embodiment of the new and improved television viewing distance safety system embodying the principles and concepts of the present invention and generally designated by the reference number 10 will be described.

The preferred embodiment of the present invention comprises a plurality of components. In their broadest context, such components include a housing, a sensor assembly mechanism, an alarm mechanism, an electrical receptacle, a timed switching mechanism, a power cable, and a power switch. Such components are individually configured and correlated with respect to each to provide a system that prevents a child 12 or other individual from watching a conventional television receiver 13 at a potentially harmful close viewing distance.

Figure 1A:
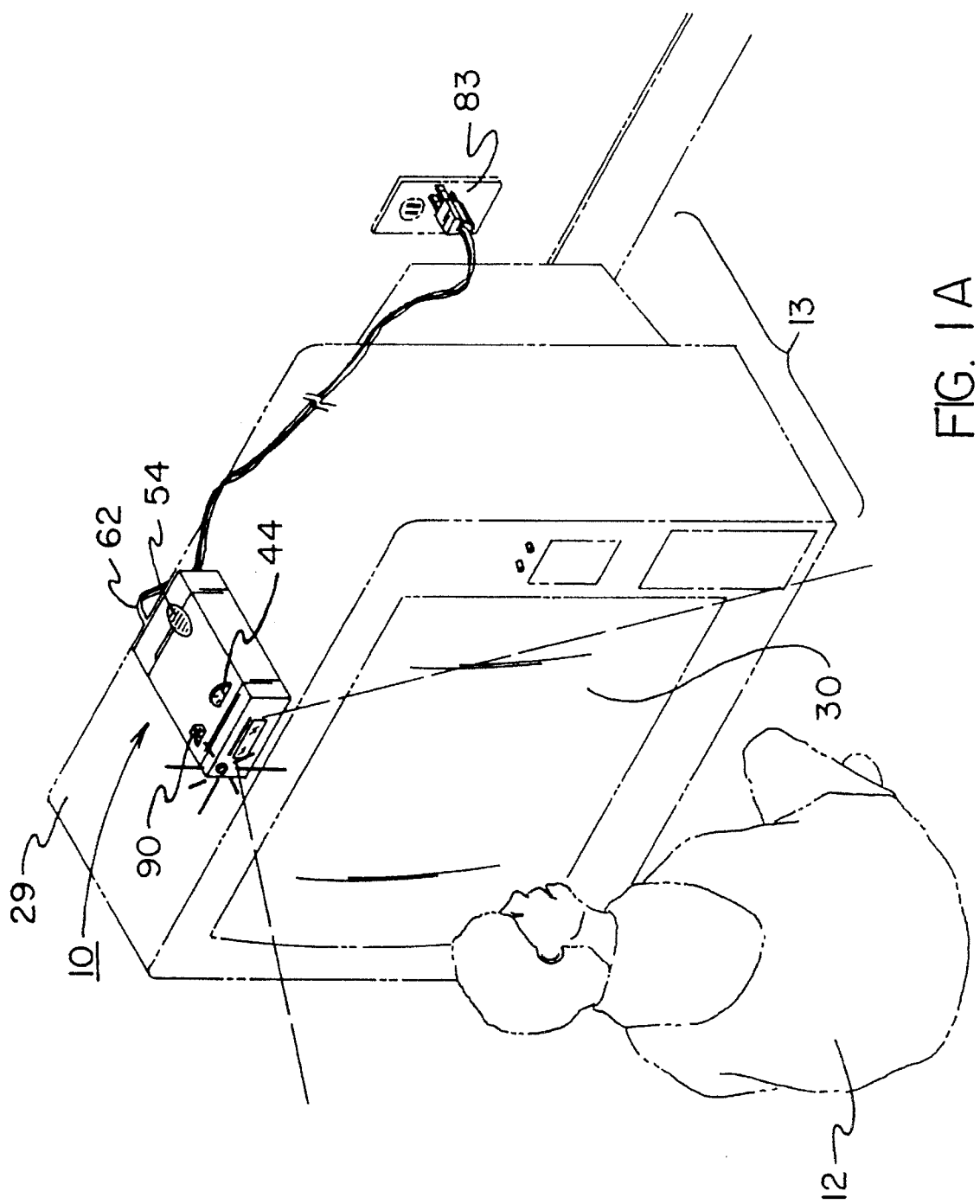
FIG. 1A is a perspective view of the preferred embodiment constructed in accordance with the principles of the present invention for use with an existing conventional television receiver.
Figure 1B:
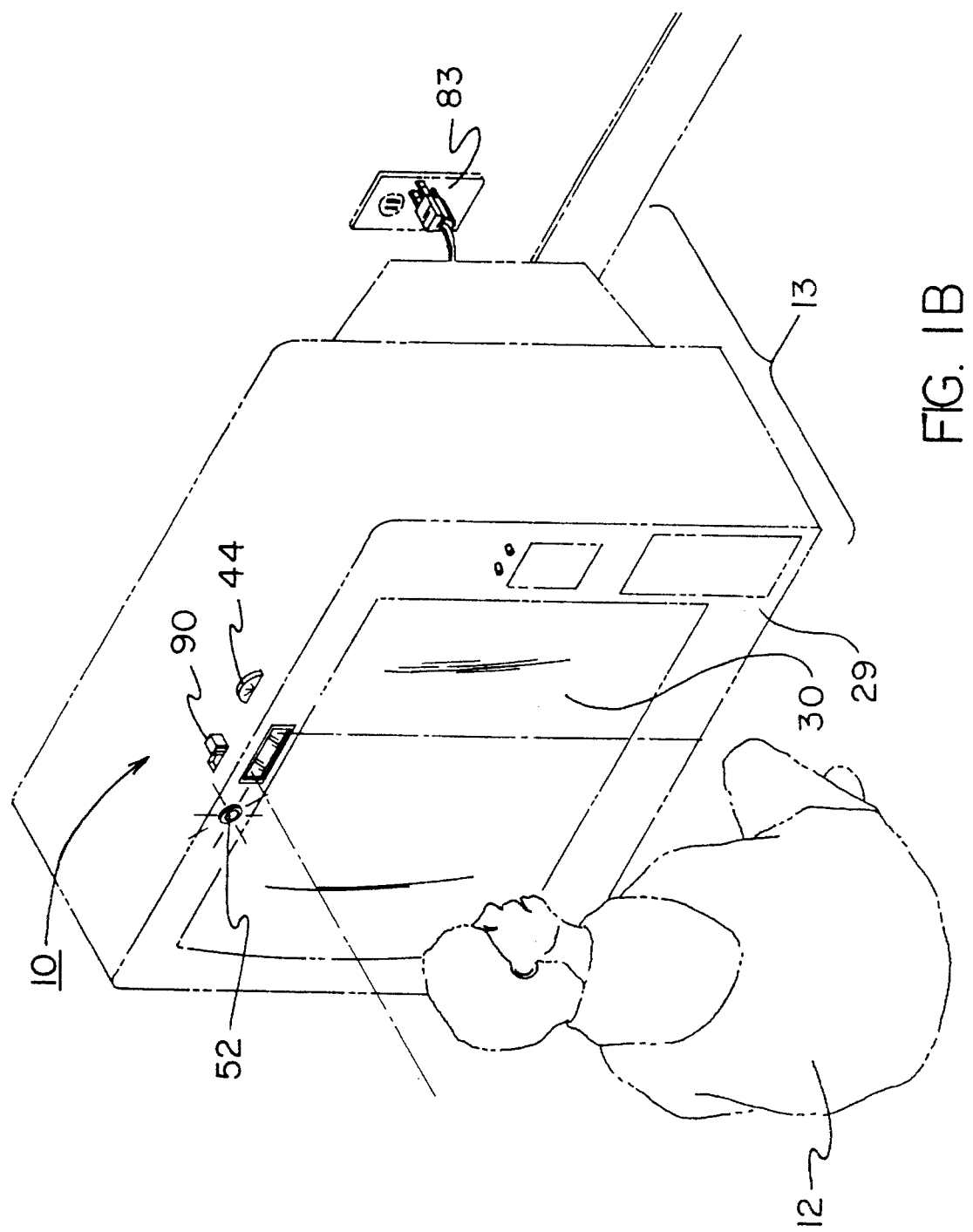
FIG. 1B is a perspective view of an alternate embodiment of the present invention that is directly integrated for use with a conventional television receiver.
Figure 2:
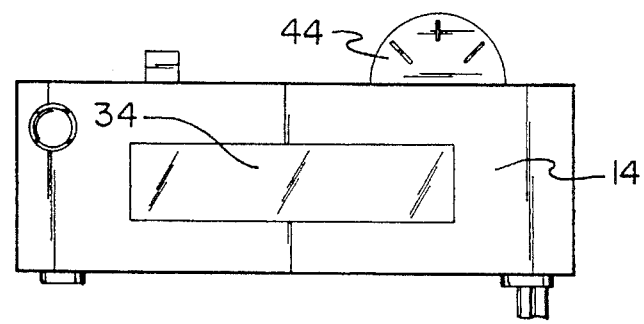
FIG. 2 is a front view of the preferred embodiment of the present invention.
Figure 3:
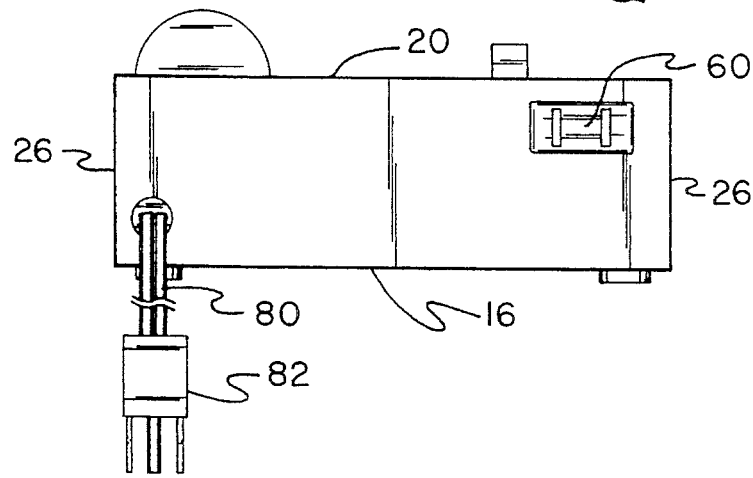
FIG. 3 is a rear view of the preferred embodiment of the present invention.
Figure 4:
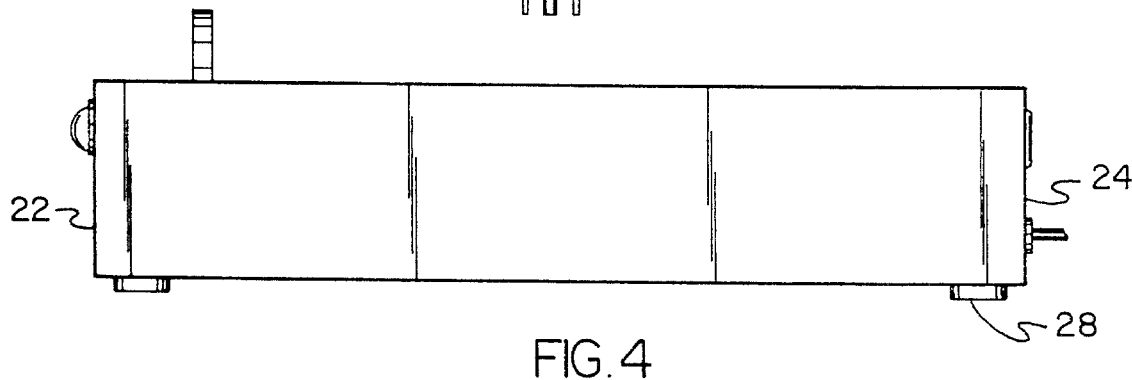
FIG. 4 is a side view of the preferred embodiment of the present invention.

Specifically, the preferred embodiment of the present invention includes a box-shaped and hollow housing 14 as shown in FIG. 2. The housing is formed of a rigid material such as metal or plastic. The housing has a bottom wall 16, a top wall 20, and a periphery interconnecting the top wall and bottom wall. The periphery is formed of a front wall 22, a rear wall 24, and a pair of opposed long side walls 26 as shown in FIG. 3 and FIG. 4. A non-slip rubber foot 28 is extended downwards from each corner of the bottom wall. The feet are used for positioning the housing upon a recipient surface that is proximal to a screen 30 of a television receiver 13. Preferably, as shown in FIG. 1, the housing is placed upon the television receiver's housing 29 at a location directly above the screen 30. The front wall 22 of the housing is generally aligned in parallel with the screen. In addition, the front wall 20 of the housing has a generally transparent rectangular window 34 formed thereon. The window is formed of a plastic or glass material that allows the transmission of electromagnetic waves from the housing and receipt of reflected electromagnetic waves into the housing.

Figure 8A:
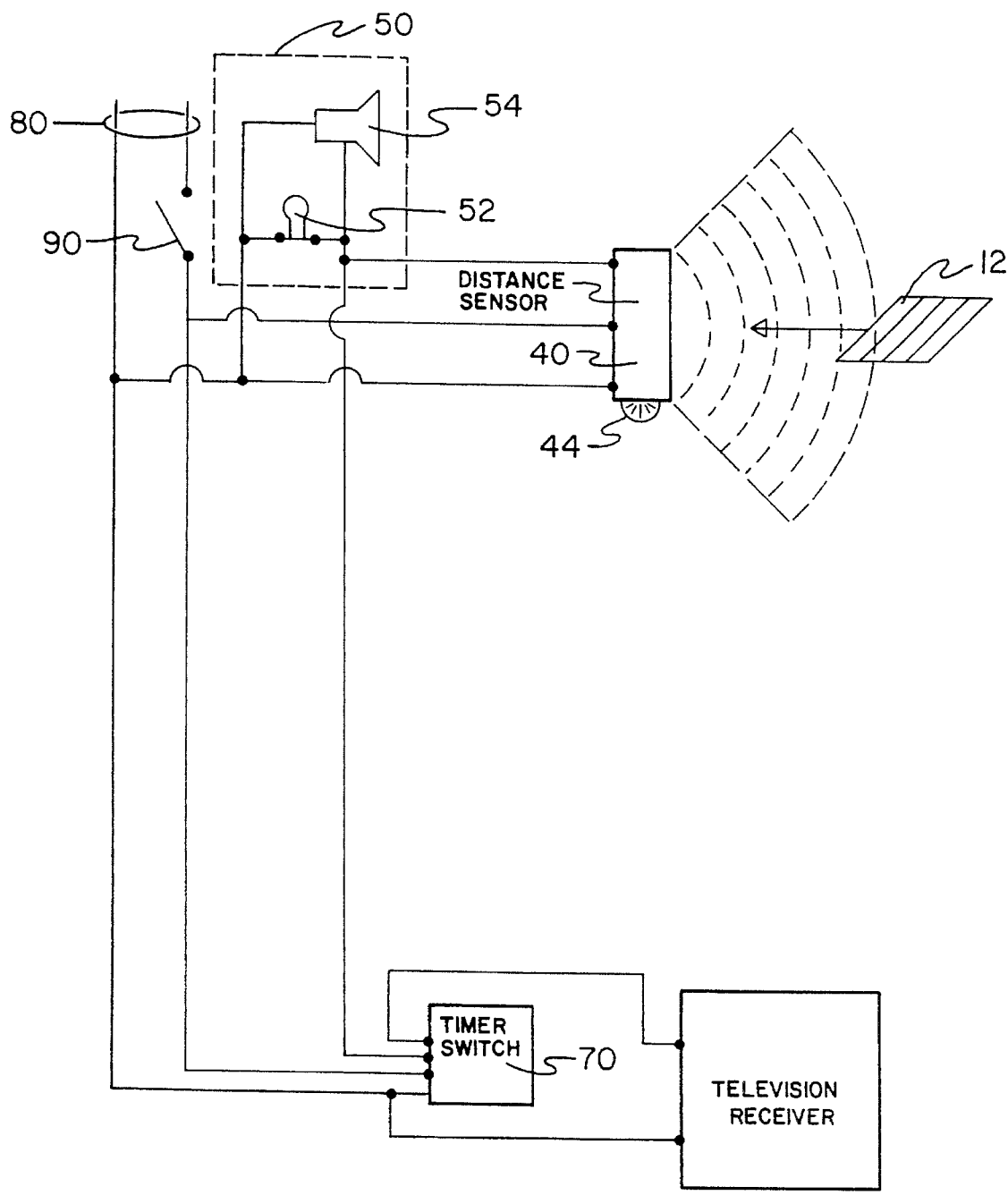
FIG. 8A is a schematic diagram depicting the interconnection of the electrical components of the preferred embodiment of the present invention.
Figure 8B:
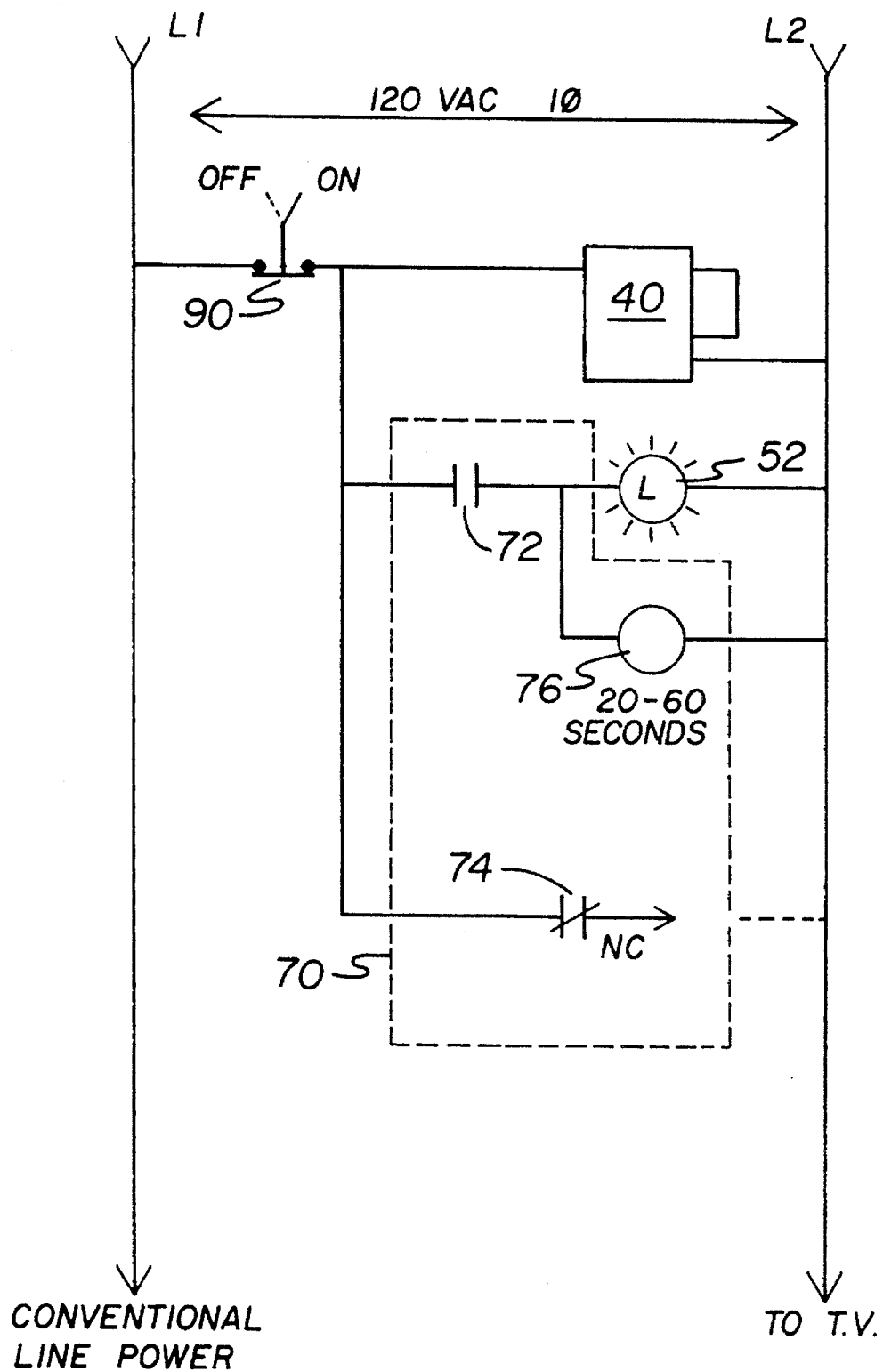
FIG. 8B is another schematic diagram of the interconnection of the electrical components of the alternate embodiment of the present invention.

Disposed within the housing is an electronic sensor assembly mechanism 40 as shown in FIGS. 8A and 8B. The sensor assembly mechanism has several functions. First, the sensor assembly mechanism radiates an electromagnetic signal through the window 34 to a remote location in front of the screen 30 of the television receiver. Next, the sensor assembly mechanism detects a reflected portion of the signal back through the window from an object such as a child 12 who is positioned within a predetermined distance from the screen. This predetermined distance is a radial distance of an imaginary arc of a sector of interest that extends outward from the window 34. The predetermined distance sets an outermost bound upon which reflected signals traveling back through the window can be registered or detected. Upon receipt of a reflected portion of the signal, the sensor assembly mechanism transmits an indication of the presence of the detected object. In addition, the sensor assembly mechanism includes a manually actuated dialable electronic switch mechanism 44 as shown in FIG. 1A and FIG. 8. The switch mechanism 44 is in electrical communication with the sensor assembly mechanism 40 and cooperative therewith for allowing the predetermined distance to be changed. The dialable switch mechanism 44 is extended through the top wall 20 of the housing for allowing its ready access. Both the sensor assembly mechanism 40 and the switch mechanism 44 are formed of conventional electronic circuitry.

Figure 5:
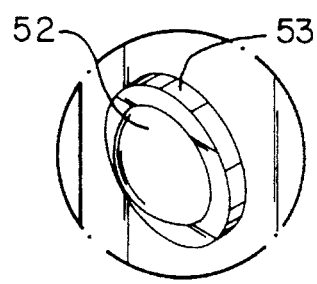
FIG. 5 is an enlarged view of the extension of the alarm means from the housing for providing a visual indication that a child is watching television too closely.

An alarm mechanism 50 is provided. The alarm mechanism is coupled to the sensor assembly mechanism 44 and is in electrical communication therewith. The alarm mechanism 50 includes an incandescent lamp 52 or light emitting diode that is extended through the front wall 22 of the housing as shown in FIG. 5. The lamp 52 provides a visual warning upon receipt of the indication from the sensor assembly mechanism 40 to signify the presence of the detected object such as a child 12. The lamp 52 is secured to the front wall 22 of the housing through use of a seal ring 53. The alarm mechanism 50 can also include an optional speaker 54 that is coupled in parallel with the lamp 52. The speaker provides an audible warning upon receipt of the indication signal from the sensor assembly mechanism 40. Both the lamp and the speaker thus alert the child or individual that he or she is positioned too close to the television screen.

Coupled to the rear wall 24 of the housing is an auxiliary electrical receptacle 60. The receptacle is conventional in design and securable to a plug end 62 of the television receiver. The electrical receptacle is used for suppling electrical power to the television receiver 32 for operation.

A timed switching mechanism 70 is also provided. The timed switching mechanism is coupled between the alarm mechanism 50 and the electrical receptacle 60. The timed switching mechanism is responsive to the activation of the alarm mechanism 50 for preventing delivery of electrical power to the electrical receptacle after a predetermined amount of time, preferably between about 30–60 seconds. Such response is provided through the use of a set of normally open contacts 72 and a set of normally closed contacts 74 that are actuated through timer 76. Thus, if a television receiver 32 is plugged into the receptacle 60 and operating, and a child then sits too closely to the screen 30, the sensor assembly mechanism 40 sends a signal for activating the timed switching mechanism 70. The alarm is then activated, warning the child that he or she is too close to the screen of the television receiver for viewing a television program. After a time period of between about 30–60 seconds, the timed switching mechanism 70 prevents electrical power from being transmitted to the electrical receptacle, thereby shutting off the television receiver 32. If a child 12 sees or hears the warning provided by the alarm mechanism 50, this child then has a period of time to adjust his or her viewing position before the television is deactivated. After being deactivated, the sensor assembly mechanism continues to monitor the area of interest. If no detected objects are present within the area of interest, the sensor assembly means then sends a reset signal to the timed switching means, thereby causing the timed switching means to allow electrical power to once again be supplied to the receptacle.

Figure 6:
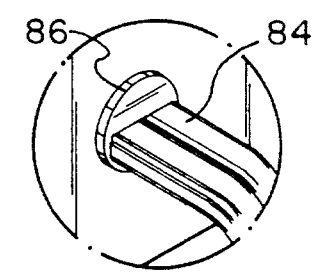
FIG. 6 is an enlarged view of the connection of the power cable with the housing of the present invention.
Figure 7:
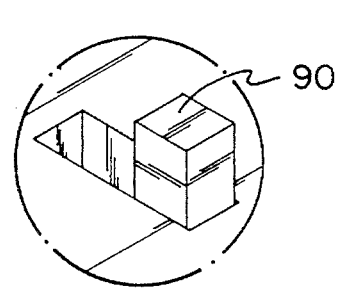
FIG. 7 is an enlarged view of the power switch of the present invention.

A sheathed power cable 80 is used for supplying electrical power to the present invention. The power cable 80 has a distal grounded plug end 82 that is securable to a remote electrical power source such as a common household electrical receptacle 83. The power cable also has a proximal terminal end 84 extended within the housing 14 and held in place with a grommet 86 as shown in FIG. 6.

Lastly, a power switch 90 is provided as shown in FIG. 9. The power switch is coupled between the terminal end 84 of the power cable 80 and the sensor assembly mechanism 40, the alarm mechanism 50, and the timed switching mechanism 70. The power switch has one orientation for allowing supply of electrical power from the remote electrical power source for operation of the television viewing distancing the system 10 and the television receiver 32 securable thereto. The power switch also has another orientation for preventing such supply of electrical energy.

An alternate embodiment of the present invention is depicted in FIGS. 1B and 8B. This alternate embodiment is integrated as one unit with an existing television receiver 13. The integrated system is contained in a single housing provides a measure of convenience since a separate unit 10 as previously described does not have to be independently positioned and energized for use with the television receiver. This embodiment can include the dialable switch mechanism 44 and the power switch 90. In addition, this alternate embodiment can employ conventional electronic circuitry that is integrated with the conventional display circuitry of the television receiver 13 to provide an alternate viewable signal that is displayed on the screen. This visual signal can be realized a small symbol or letter that enlarges in size to cover approximately 70 percent of the viewing area of the screen 30 when a viewer or object is positioned too close. This display circuitry can be used in lieu of the timer switching mechanism 70 so that the television receiver does not have to be shut off when viewers are positioned within the predetermined detection distance.

The present invention is designed to signal either by a light or by a sound when a child is too close to a television screen. If a child is to close to a television screen, the present invention signals a warning. If after a certain amount of time the child does not move to a distance greater than the predetermined distance, the television receiver will automatically shut off. The television receiver turns on only when the child moves to a distance greater than the predetermined distance. The housing of the present invention has a height of about 2 inches, a length of about 6 inches, and a width of about 4 inches. These dimensions allow the housing to be placed in operation upon most commercially available television receivers. The housing can be formed in a variety of ascetically pleasing shapes to conform with the decor of a living area. Preferably, the predetermined period of time as to when the timed switching mechanism shuts power off to the television receiver is between about 30–60 seconds. The sensor assembly mechanism can be formed of a conventional pulse-echo radar. Essentially, the pulse-echo radar radiates a signal into free space and listens for the echo or reflected component of such signal. By analyzing the reflections, the radar can determine the distance and direction of objects encountered. The pulse-echo radar also includes conventional range-gating capability. By setting the radar's range-gating capability to open only at the right time to receive echoes corresponding to distances equal to or less than the predetermined distance, the radar can ignore all other echoes outside the predetermined distance. Ultrasonic or infrared-type radar systems can be utilized.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A television viewing distance safety system for preventing children from watching television at a potentially harmful close viewing distance comprising, in combination:

a rigid box-shaped hollow housing having a bottom wall, a top wall, and a periphery interconnected therebetween formed of a front wall, a rear wall, and a pair of opposed long side walls and with the bottom wall further having a plurality of feet extended downwards therefrom for positioning the housing upon a recipient surface proximal to a screen of a television receiver and with the front wall further having a generally transparent rectangular window formed thereon;

sensor assembly means disposed within the housing for radiating a signal through the window to a remote location in front of the screen of the television receiver, detecting a reflected portion of the signal through the window from an object positioned within a predetermined distance therefrom, and transmitting an indication of the presence of the detected object, the sensor assembly means having a manually actuated dialable switch means cooperative therewith and extended through the top wall of the housing for allowing the predetermined distance to be changed;

alarm means coupled to the sensor assembly means and extended through the front wall of the housing for providing a visual warning upon receipt of the indication to signify the presence of the detected object;

an auxiliary electrical receptacle coupled to the back wall of the housing and with the receptacle securable to a plug end of the television receiver for supplying electrical power thereto for operation;

timed switching means coupled between the alarm means and the electrical receptacle and with the timed switching means being responsive to the activation of the alarm means for preventing delivery of electrical power to the electrical receptacle after a predetermined amount of time;

a power cable for supplying electrical power having a distal plug end securable to a remote electrical power source and a proximal terminal end extended within the housing; and a power switch coupled between the terminal end of the power cable and the sensor assembly means, the alarm means, and the timed switching means and with the power switch having one orientation for allowing supply of electrical power for operation of the television viewing distance safety system and the television receiver securable thereto and another orientation for preventing such supply.

2. A television viewing distance safety system comprising:

a television receiver having a viewable screen;

sensor assembly means positioned at a location proximal to the screen of a television receiver for radiating a signal to a remote location in front of the screen, detecting a reflected portion of the signal from an object positioned within a predetermined distance therefrom, and transmitting an indication of the presence of the detected object, and wherein the sensor assembly means includes a manually actuated dialable switch means cooperative therewith for allowing the predetermined distance to be changed;

alarm means coupled to the sensor assembly means for providing a warning upon receipt of the indication to signify the presence of the detected object;

timed switching means coupled between the alarm means and the television receiver and with the timed switching means being responsive to the activation of the alarm means for preventing delivery of electrical power to the television receiver, and wherein the sensor assembly means, the alarm means, and timed switching means are encased in a housing that has a window formed thereon from which the signals from the sensor assembly means are radiated;

an auxiliary electrical receptacle coupled to the sensor assembly means and with the receptacle securable to a plug end of the television receiver for supplying electrical power thereto for operation; and power supply means coupled to the sensor assembly means, the alarm means, timed switching means, and receptacle for supplying electrical power for operation.

* * * * *